April 3, 1928.
H. E. VOSS
INSECT DESTROYER
Filed Aug. 1, 1927
1,664,762
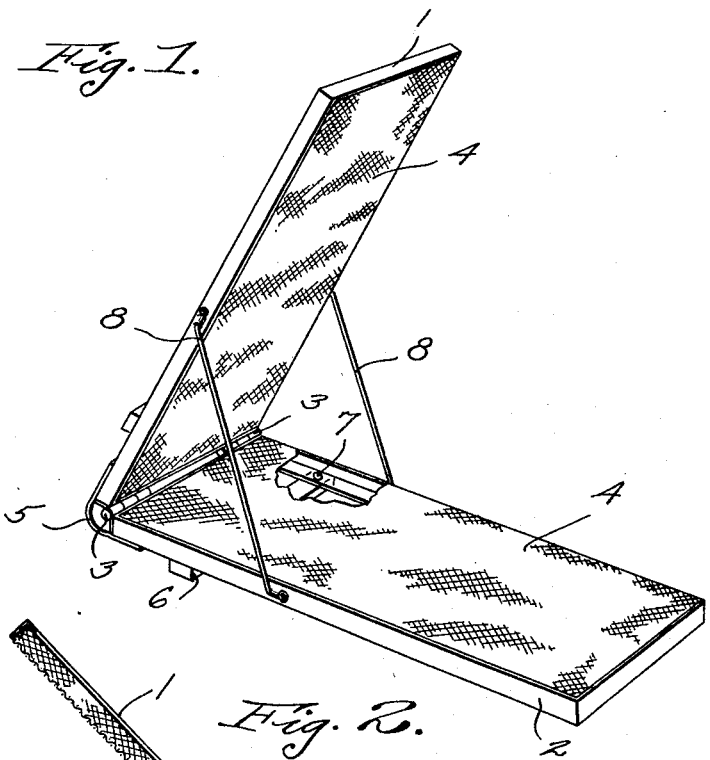
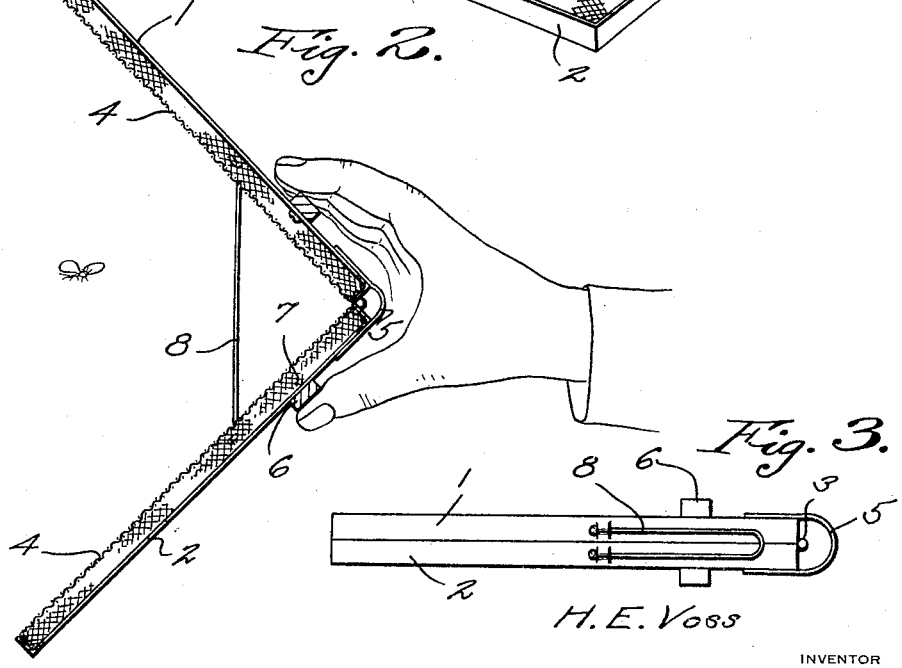
H. E. VOSS
INVENTOR

1,664,762

Patented Apr. 3, 1928.

UNITED STATES PATENT OFFICE.

HERMAN E. VOSS, OF YUHSIEN, CHINA.

INSECT DESTROYER.

Application filed August 1, 1927. Serial No. 209,940.

This invention relates to insect destroyers and its object is to provide an insect destroyer in the nature of a swatter, that is capable of killing insects and the like while flying, in an adequate and efficient manner.

Another object of the invention is to provide an insect destroyer that is simple in construction, easy to operate, strong and sturdy and which is inexpensive to manufacture.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts thoroughout the several views, and in which:

Figure 1 is a perspective view of an insect destroyer forming the subject matter of the present invention.

Figure 2 is a side elevation showing the device in use.

Figure 3 is a similar view with the parts closed.

Referring to the drawings in detail the reference numerals 1 and 2 indicate similar constructed elongated frames formed from angle iron or the like as suggested in Figure 1 of the drawings, and having one of their ends hingedly secured together through the instrumentality of spaced hinges 3. The confronting faces of the frames 1 and 2 are covered with wire mesh indicated by the reference numeral 4. and secured to the hinged ends are leaf springs 5 which are adapted to urge and retain the frames in the position as shown in Figures 1 and 2 of the drawings. Bridging the side members of each frame is a transversely disposed strip 6 which have their ends secured to one angle portion of the side members through the instrumentality of screws 7. These strips 6 are disposed adjacent the hinged ends of the frames and not only act to brace the frames, but also are adapted to provide finger grips for operating the device as shown in Figure 2.

In order to limit the movement of the frames by the leaf springs 5 I have provided flexible elements 8 which have their respective ends secured in the side members, and these flexible elements retain the frames in the position as shown.

From the above description and disclosure in the drawings, it will be obvious that I have provided an insect destroyer for killing insects and the like when flying, and the operator of the device can grip the strip 6 and dispose the frames in range of a flying insect as shown in Figure 2, and then apply pressure for disposing the respective frames in contacting engagement against the tension of the springs 5 as shown in Figure 3 of the drawings. When the frames are disposed together in a quick manner as suggested, it will be obvious that the insect will be caught and crushed in the interstices of the wire mesh 4.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

An insect destroyer of the character described comprising elongated frames, wire mesh covering one of the faces thereof, hinges secured to one of the ends thereof for mounting the frames for movable relation with respect to each other, spring means for urging the frames to open position, flexible means secured to said frame to limit the open position thereof, and finger gripping pieces transversing each of said frames and being arranged adjacent the hinged ends thereof.

In testimony whereof I affix my signature.

HERMAN E. VOSS.